United States Patent [19]
Kean

[11] Patent Number: 5,778,264
[45] Date of Patent: Jul. 7, 1998

[54] APPARATUS FOR REDIRECTING CAMERA FLASH LIGHT

[76] Inventor: Brenda Kean, 5 Lingmoor Drive, Manor Park, Burnley, Lancashire, BB12 8UA, United Kingdom

[21] Appl. No.: 581,618
[22] PCT Filed: Jul. 22, 1994
[86] PCT No.: PCT/GB94/01588
  § 371 Date: May 22, 1996
  § 102(e) Date: May 22, 1996
[87] PCT Pub. No.: WO95/04302
  PCT Pub. Date: Feb. 9, 1995

[30] Foreign Application Priority Data
  Jul. 28, 1993 [GB] United Kingdom ............ 9315577

[51] Int. Cl.⁶ ............... G03B 15/03; G03B 15/06
[52] U.S. Cl. ................ 396/174; 396/200; 362/7; 362/18; 362/320; 362/346; 362/352; 362/359; 362/360
[58] Field of Search ............... 354/126, 141, 354/149.1, 149.11, 295; 396/155, 174, 178, 200; 362/7, 16, 18, 320, 352, 317, 341, 346, 351, 359, 360

[56] References Cited

U.S. PATENT DOCUMENTS

| 4,428,030 | 1/1984 | Baliozian | 362/18 |
| 4,616,293 | 10/1986 | Baliozian | 362/7 |
| 5,337,104 | 8/1994 | Smith et al. | 354/149.11 |

*Primary Examiner*—Safet Metjahic
*Assistant Examiner*—J. K. Han
*Attorney, Agent, or Firm*—Harrison & Egbert

[57] ABSTRACT

A photographic reflector is provided either to convert a forward-illuminating flash unit into one which will produce reflected light or for use directly with a bounce-head flash unit. The reflector includes an internal reflective hood (20) with an attachment (17) so as to enable it to be secured to a flash unit (24). A mirror (21) is provided which is angled between thirty degrees and sixty degrees inclusive with respect to a forward facing light-emitting surface of the flash unit (24) when the reflector is secured thereto. In this way, the flash of light is directed upwardly by the mirror (21) into the internally reflective hood (20) so as to produce a reflected flash of light for illumination of a photographic subject.

15 Claims, 5 Drawing Sheets

APPARATUS FOR REDIRECTING CAMERA FLASH LIGHT

TECHNICAL FIELD

The present invention relates to a photographic reflector and in particular to a reflector which can be used with a forward-illuminating flash-unit to reproduce the effect of a bounce-head flash unit to produce indirect light.

BACKGROUND ART

Reflected or bounced flashlight is often used in photography to produce various effects and to eliminate certain undesirable features of direct flash photography such as red eye and deep silhouette shadows cast behind the subject. It is achieved by the use of a bounce-head flash unit which emits flashlight upwardly for reflection on to the subject either by the ceiling of a room or by a reflector.

Conventional reflectors used for this purpose comprise either reflective photographic umbrellas which must be supported in an appropriate relationship to the flash unit or box-like attachments which are attached to the flash unit itself. A reflector of the first type is shown and described in U.S. Pat. No. 4,524,405 and comprises a fabric-covered, fan-shaped reflector which can be supported by a conventional telescoping light stand. In contrast, a reflector of the second type is described in U.S. Pat. No. 4,539,624 and comprises a box-like device which fits, via an adaptor, over the top of the flash unit. A slot is provided in the top of the device in which a tongue of a plate-like reflector may be fitted to hold the reflector at an appropriate angle above the flash gun. A similar reflector of the second type is described in U.S. Pat. No. 4,066,885 wherein a frame is attached to the flash unit to hold a central bilateral trapezoidal reflecting panel, supported by two triangular panels at its sides, above the flash gun.

Both of these types of reflector have disadvantages. The umbrella reflectors are bulky and require a separate support thus making them difficult to transport and unsuitable for use outside a studio. In contrast, whilst the box type of reflector is more suitable for outdoor work and for use by amateur photographers, they are still difficult to transport easily in a photographic bag without damage. In addition, when special effects are required, appropriately coloured foils to provide the reflective surface must be attached to the reflector or the box; these foils are easily lost or torn.

It will also be appreciated that most amateur cameras are compact cameras wherein a forward-illuminating flash unit is in-built with the camera to form a single unit. Thus, the advantages of using reflected flashlight are denied to the photographer when using such a camera.

German Patent Specification DE 35 40 975 describes an apparatus for attachment to a camera with a forward-illuminating flash unit which distributes light by means of reflecting surfaces into a region of the exposure plane which lies beyond the optical axis of the camera lens. The apparatus comprises a box with internally reflecting surfaces and the photographic subject may be mounted either inside the box, for example if the apparatus is to be used for photo-copying transparencies, or outside the box but near to the camera lens for close-up work. However, this apparatus is designed specifically for close range work and not to produce diffuse flashlight for general use in longer range photography such as portraiture. It is also bulky and would be inconvenient to transport in a photographic bag.

A first object of the present invention is to provide a photographic reflector which can be used to convert a forward-illuminating flash unit into one that will produce reflected flashlight and which is easy to transport to enable, for example, amateur photographers and those without specialist equipment to obtain the advantages afforded by reflected flashlight.

SUMMARY OF THE INVENTION

Thus, according to a first aspect of the present invention there is provided a photographic reflector for a forward-illuminating flash unit to convert same into one which will produce reflected flashlight, comprising a hood made from a creased one-piece blank folded along creases, the blank being provided with a first reflective surface on a first portion of one side thereof; attachment means for securing the hood to the flash unit such that the first reflective surface is inclined with respect to the light-emitting surface of the flash unit at a predetermined angle; and a mirror inclined with respect to the light emitting surface of the flash unit at an angle between 30° and 60° inclusive and positioned so as to redirect the flashlight emerging from the light-emitting surface onto the first reflective surface of the hood when secured to the flash unit thereby to produce reflected flash light for illumination of a photographic subject.

Preferably, the hood is foldable along at least one crease into a flat state when not in use.

Preferably also, the mirror comprises a second reflective surface integrally provided on a second portion of the hood, which can be folded along at least one of the creases so that the second reflective surface lies facing the first reflective surface.

However, it will be appreciated that the internally reflective hood forming a part of the first aspect of the present invention can be used alone as a reflector for a bounce-head flash unit. It is therefore, a second object of the present invention to provide a photographic reflector which overcomes or substantially mitigates the aforementioned problems of conventional bounce-head flash reflectors to provide a reflector which is comparatively inexpensive and easy to manufacture, transport and use.

Thus, according to a second aspect of the present invention there is provided a photographic reflector for a bounce-head flash unit comprising a hood made from a creased one-piece blank folded along creases and provided with a first reflective surface on at least a first portion of its interior side; and attachment means for securing the hood to the flash unit such that the reflective surface is inclined at an angle between 30° and 60° inclusive with respect to the light-emitting surface of the flash unit when secured thereto in order to reflect incident flashlight for illumination of a photographic subject.

Preferably, the reflector is made from card coated with a polyester film.

Preferably also, the card is coated with a gold or silver coloured metallized polyester film.

BRIEF DESCRIPTION OF THE INVENTION

DETAILED DESCRIPTION OF THE INVENTION

A reflector according both aspects of the invention is preferably manufactured from stiff card of approximately 450 microns thickness which is provided with a light reflecting surface on at least one side. However, a thin plastics sheet could also be used.

Figure 1:
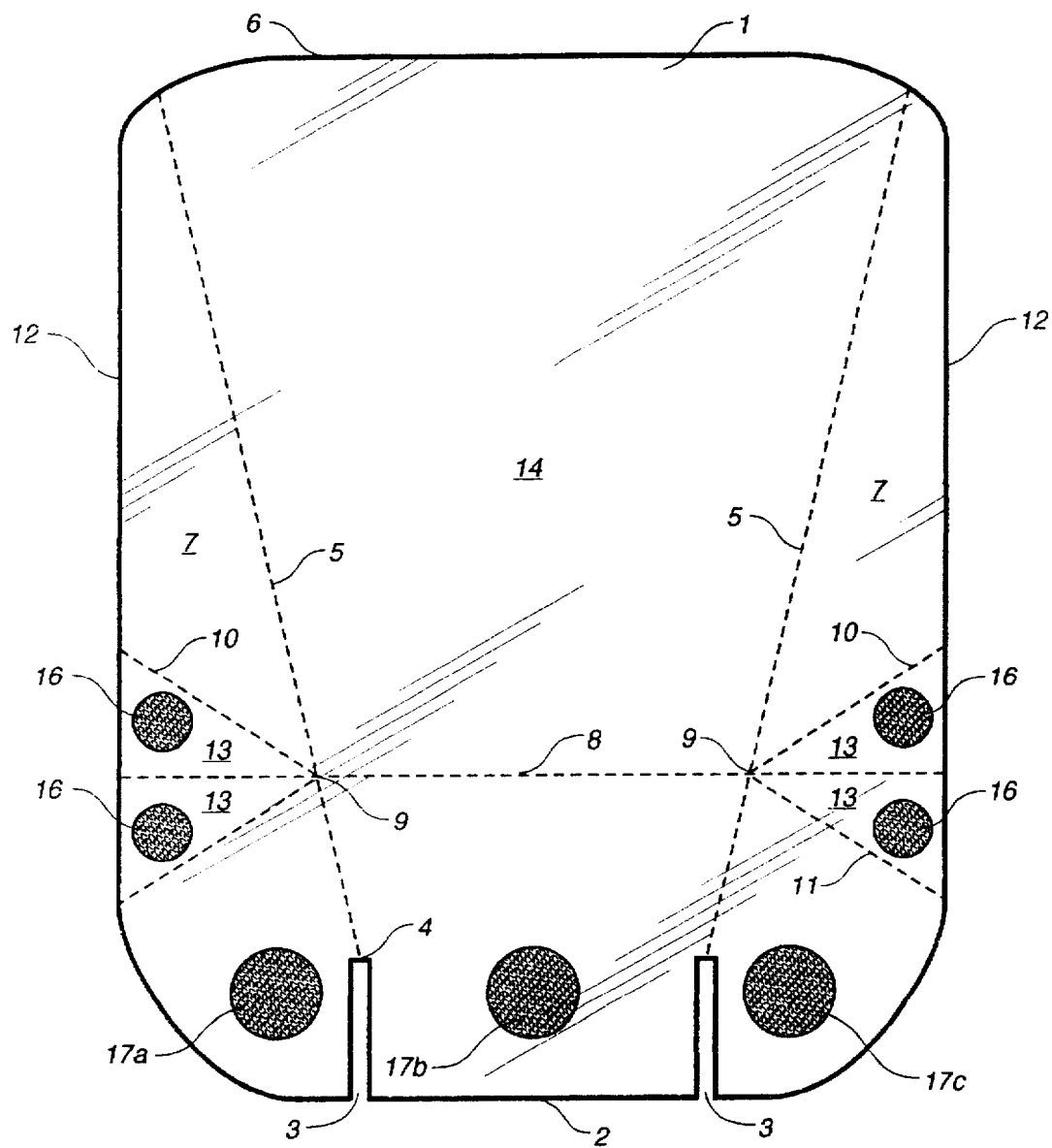
FIG. 1 shows a blank from which a reflector according to the second of the invention can be folded.
Figure 2:
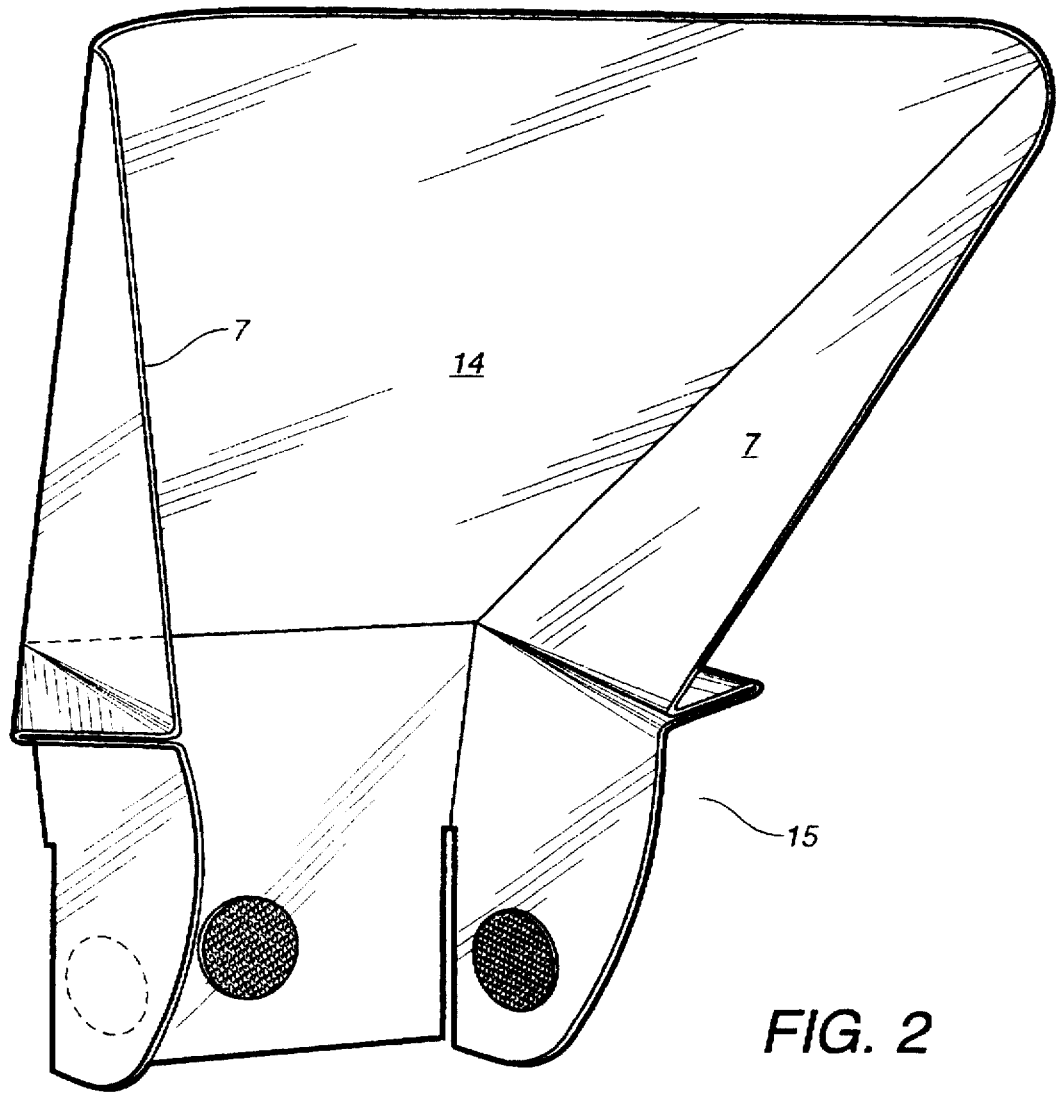
FIG. 2 is a perspective view of the reflector shown in FIG. 1 when folded into a reflective hood.
Figure 3:
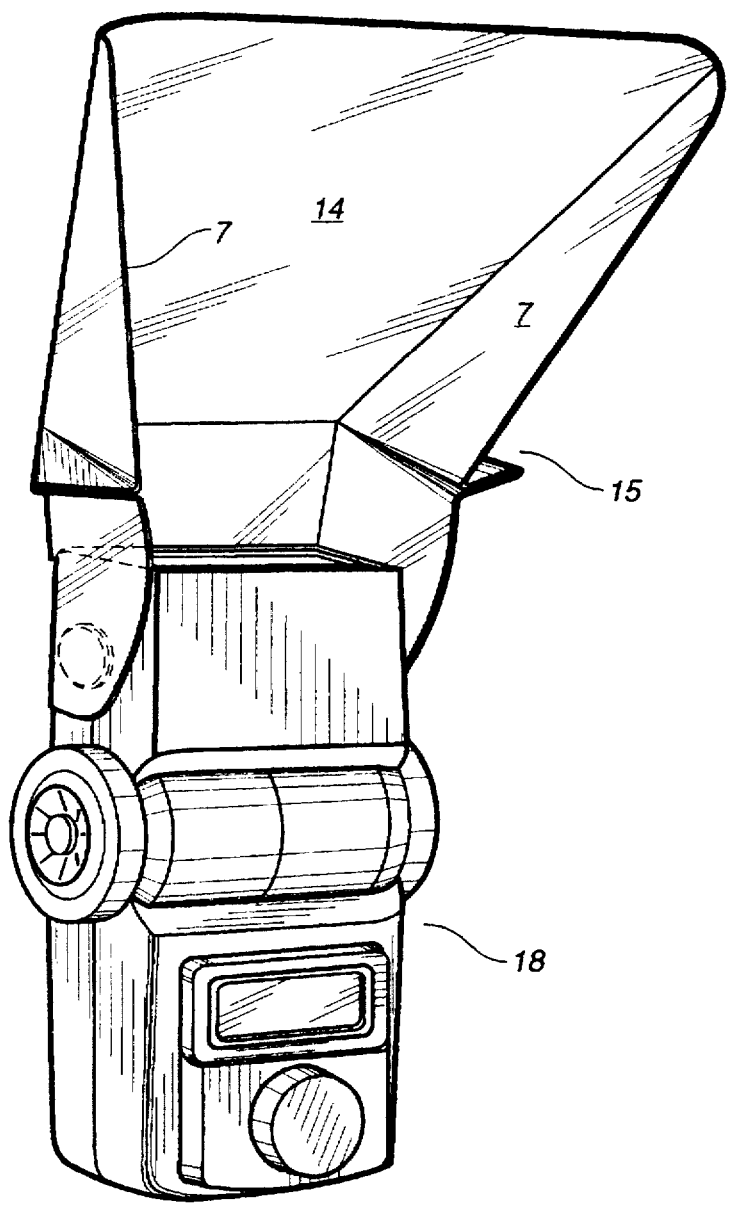
FIG. 3 is a perspective view of the reflector shown in FIG. 1 when folded and attached to a bounce-head flash unit.

FIGS. 1 to 3 show a reflector for use with a bounce-head flash unit. As shown in FIG. 1, a blank 1 for the reflector comprises a rectangular piece of the card with rounded corners. Typically, the blank 1 will have overall dimensions of the order 225×175 mm but may be increased in size for fitment to certain professional size flash units.

Along one of the shorter sides 2 of the blank a pair of parallel slots 3 are cut, the length of which slots is of the order of 35 mm and they are located approximately 70 mm apart centrally of the side 2. From each of the closed ends 4 of these slots 3 the blank is creased along a straight line 5 up to the adjacent corner on the opposite short side 6 of the blank 1. This defines two substantially triangular flaps 7 at each side of the blank 1.

Parallel with the sides 2 and 6 of the blank and perpendicular to the slots 3 is another crease 8 which is located approximately 70 mm from the side 2. At each of the intersections 9 of this crease 8 with the creases 5 a further pair of creases 10 and 11 are formed which radiate out from intersection 8 to the longer sides 12 of the blank at equal angles of approximately 30° to the crease 8. At each end of the crease 8, the creases 10 and 11 define two adjacent triangular areas 13 which are located on opposite sides of the crease 8 from one another. In addition, a large trapezoidal area 14 is defined by the creases 5 and 8 and the shorter side 6 of the blank 1.

If, when considering FIG. 1, one assumes that the reflective surface of the blank is that facing the viewer, then the creases 5 are made so that the flaps 7 can be folded upwards towards the viewer out of the plane of the paper. The crease 8 is folded in the same way as the creases 5 but the creases 10 and 11 are folded in the opposite direction.

Prior to use, the blank 1 is folded to make a reflector by pinching together the respective triangular areas 13 at each end of the crease 8. This forces the blank 1 to bend along the crease 8 and along the creases 5 to form a hood 15 as shown in FIG. 2. In order to retain the hood-like shape, the areas 13 can be either be secured permanently together by, for example, adhesive or staples, or be secured releasably by, for example, poppers, clips, or pads 16, as shown in FIG. 1, made from impact hooked-pile thread fastener such as is sold under the trade mark Velcro.

Pads 17a, 17b, 17c also made from the same impact hooked-pile thread fastener as the pads 16 are provided for securing the hood 15 around the back side of a bounce-head flash unit 18. The pads 17a, 17b, 17c are located at each side of and between the slots 3 respectively as indicated in FIG. 1 and corresponding complimentary pads (not shown) must be secured to the sides and back of flash unit 18.

When attached to the flash unit 18, as shown in FIG. 3, the hood 15 projects over the top of the unit 18 so that light emanating therefrom is reflected forwards on to the subject. It will be appreciated that the major reflective areas of the hood 15 essentially comprise the area 14 and the side flaps 7. In order to ensure the majority of the flash light is reflected on to the subject, the blank 1 is creased and slotted in such a way as to ensure that when folded the area 14 lies at an angle of between 30° and 60° inclusive with respect to the upper light-emitting surface of the flash unit 18. Preferably and as would occur with the dimensions for the blank given in this example, the area 14 lies at an angle of 45° to the upper surface of the unit 18.

After use, the hood 15 can be simply removed from the flash unit 18 and returned back to a flat state for ease of packing away and transportation by being folded along the crease 8.

In a modification, the slots 3 and the pad 17b can be omitted and the hood simply folded around the flash unit 18. In this case, the slots 3 can be replaced by additional crease lines and the crease lines 5 extended to end close to the shorter side 2 of the blank 1.

Normally three reflector colours are employed for bounce-flash photography. A white reflecting surface gives a soft diffused light. In contrast a silver surface gives a bright diffused light which eliminates the problems of red eye and unwanted shadows in portrait photography. Gold reflectors are also used for portrait photography as they give a warm light for flattering flesh tones 5.

A white reflector can be provided by simply coating a suitable white card from which the blank is to be cut with a clear varnish but preferably the card is coated with a clear polyester film.

In order to provide a silver or gold coloured reflecting surface, the card from which the blank is cut is preferably appropriately metallized on one side with a polyester film. Alternatively, the card is bonded to either an aluminium foil or gold leaf. The reverse side of the card is preferably coloured black and also either coated with clear polyester film or varnished.

The use of polyester films is preferable to both the use of clear varnish and the use of actual metal foils as it is significantly cheaper in the latter case and in all cases resists fingerprints which spoil the reflective surface and are difficult to remove once made. In addition, the polyester film strengthens the card making it difficult to tear and also repel rain water.

Apart from plain coloured reflective surfaces, the invention also enables special effects to be created in known manner by the use of appropriately adapted reflective surfaces such as the printing of a holographic pattern on the blank or the embossing of the reflective surface with a bubble pattern. The use of such a reflector may also obviate the need to use a lens filter for the camera for certain effects.

Figure 4:
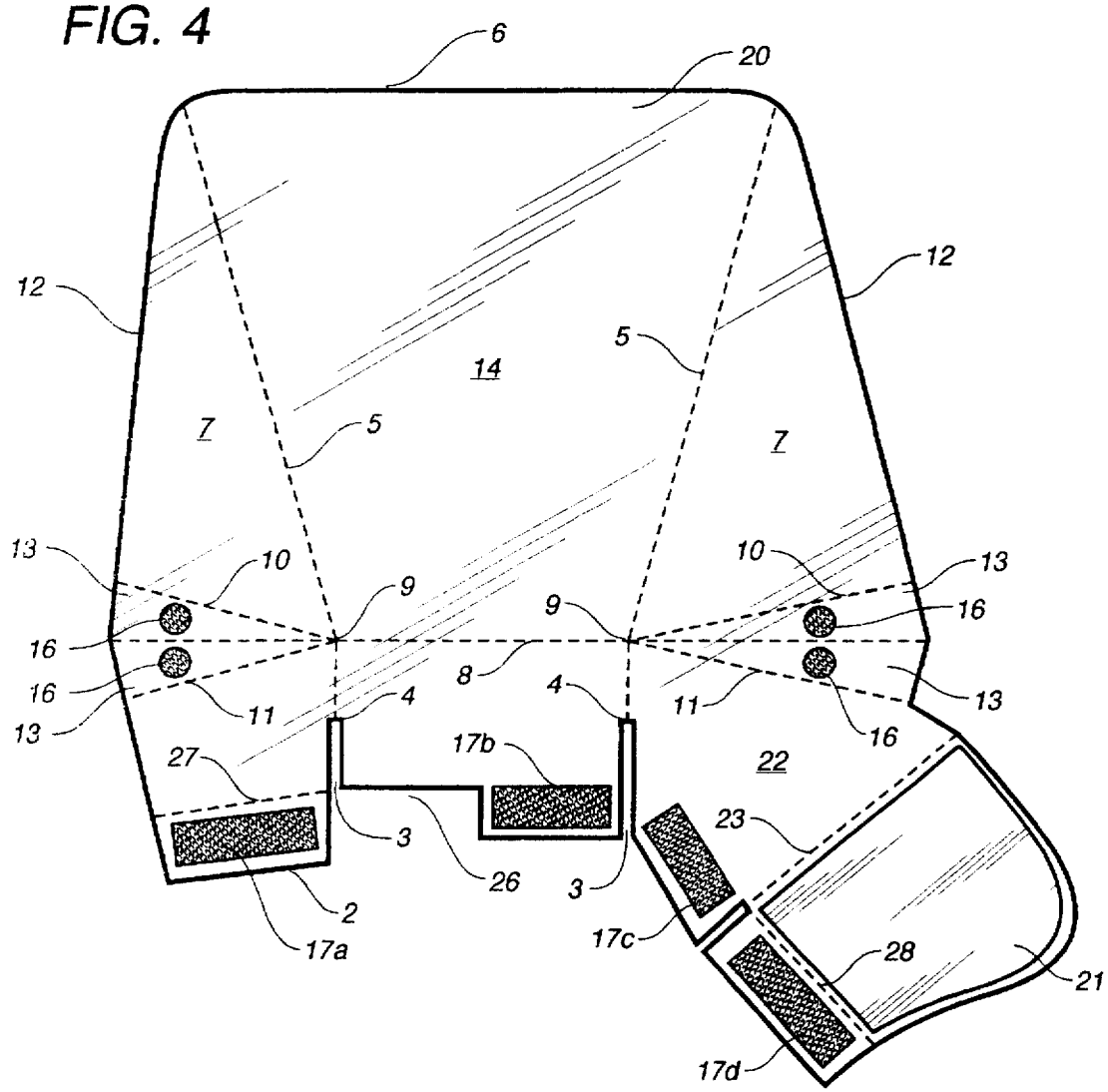
FIG. 4 shows a blank from which a reflector according to the first aspect of the invention can be folded.
Figure 5:
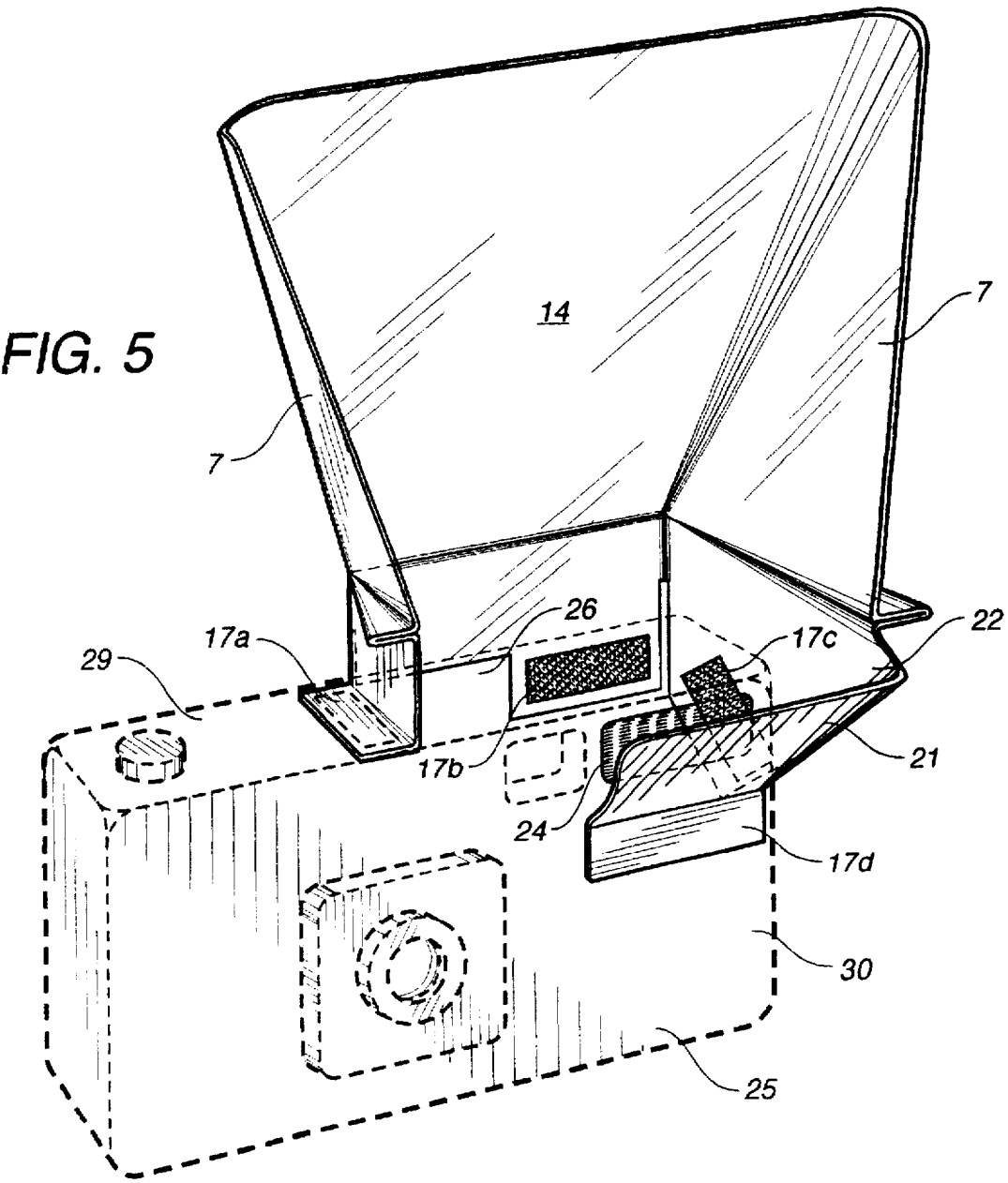
FIG. 5 is a perspective view of the reflector shown in FIG. 4 when folded and attached to a flash unit of a compact camera.

Turning now to FIGS. 4 and 5, it has been found that the advantages of using bounced flashlight can be achieved with a conventional forward-illuminating flash unit such as is found in most compact cameras using a reflector similar to that previously described but with the addition of a mirror.

A blank 20 for such a reflector is shown in FIG. 4 and it will be appreciated that it is substantially similar to the blank 1 shown in FIG. 1. Accordingly, the similar features will not be described again and are labelled with the same reference numerals as those previously described.

The major difference comprises the provision of a flap 21 adjacent an area 22 which forms the lower portion of one of the triangular areas 7 below the crease 8. The flap 21 is attached to the area 22 by a crease line 23 so that when the blank is folded to make the reflective hood the flap 21 can be folded in opposition to the reflective area 14 and lie substantially parallel thereto. Thus, in use with the reflector attached to a conventional forward-illuminating flash unit 24 of a compact camera 25, as shown in FIG. 5, the hood projects over the top of the unit 24 and the flap 21 is angled between 30° and 60° inclusive directly in front of the light-emitting surface of the unit 24 to comprise a second reflective surface. In this way the reflective surface of the flap 21 forms a mirror to direct flashlight upwardly primarily on to the area 14 and the flaps 7 thereby to produce reflected flashlight for illumination of a photographic subject. Preferably as with the previously described reflector, the dimensions of the blank 20 are such that the flap 21 is angled at 45° to the front surface of the flash unit 24 and the area 14 lies parallel to the flap 21 at an angle of 45° to the upper surface of the unit 24. Pads 16 serve to retain the blank 20 in the shape of a hood.

Other minor differences between the blank 20 and the blank 1 relate to the way in which the reflector is folded so as to be attached to the flash unit 24. As the flash unit 24 is likely to form part of a compact camera 25, an area 26 is cut-away at the lower shorter side 2 adjacent the left slot 3 with respect to FIG. 4 so as not to cover a viewfinder of the camera 25. In order to enable the reflector to be easily fitted to one side of the camera 25, a fourth pad 17d is attached to the lower portion of flap 21. In addition, the pads 17a and 17d are attached below additional crease lines 27 and 28 respectively which enable the pads 17a and 17d to be secured to the top 29 and front surface 30 of the camera 25 to one side of the flash unit 24 and immediately therebeneath respectively.

The other pads 17b and 17c are attached to one side of the viewfinder and at the top of the side of the camera respectively as shown in FIG. 5. As with the reflector previously described with reference to FIGS. 1 to 3, complementary pads are attached to the top, back, side and front of the camera 25. As before, the reflector can be attached and detached from the camera 25 as desired and, when not is use be folded flat along the crease line 8.

As previously described, in a modification the slots 3 can be omitted and, as a result, either the pad 17b or the pad 17c can be dispensed with. In this case, the crease lines 5 can be extended across the whole blank from the side 6 to the side 2.

Whilst in the above description and in the drawings it has been assumed that the camera 25 comprises a flash unit 24 to the left of the camera lens with respect to the photographer, it will be appreciated that a mirror image of the blank 20 could be provided for cameras with a flash unit located to the right of the lens. It will also be appreciated that a reflector folded from a blank 20 can be used with a separate or stand alone forward-illuminating flash unit with corresponding minor changes to the placement of the fixing pads 17 and the shape of that portion of the blank 20 to which these are attached.

As previously described, various reflector colours can be provided on the inner surface of the hood. However, as the flap 21 is intended to act as a mirror, it may be desirable that this portion of the blank 20 has a surface which is configured and coloured differently from the rest of the blank 20 and in particular differently from the main reflecting areas 7 and 14. If it is desired to ensure a substantially full spectrum of light is reflected on to the areas 7 and 14, then the flap 21 is better coloured white or silver but if special effects are required then flap 21 can be coloured and configured differently from the rest of the blank.

It will also be appreciated that the reflector according to the first aspect of the invention need not be made from a one-piece blank as described above with reference to FIGS. 4 and 5. For example, the flap 21 comprising the mirror need not be formed integrally with the rest of the blank and could be detachably secured thereto by any convenient means such as pads similar to those used to secure the reflector to the camera. Alternatively, the mirror could comprise an independent unit and be attached to the camera separately from the reflecting hood 20.

The reflectors as described above, however, are inexpensive to produce, easy to use, and can be packed flat for transportation both before and after use. They are, therefore, suitable for use by both professional and amateur phtographers alike.

The reflectors as described above, however, are inexpensive to produce, easy to use, and can be packed flat for transportation both before and after use. They are, therefore, suitable for use by both professional and amateur phtographers alike.

I claim:

1. A photographic reflector for a forward-illuminating flash unit of a camera to redirect a flash emanating from a light-emitting surface of the flash unit, comprising:

a hood assembleable for use from a creased one-piece blank, said hood being provided with an interior reflective surface on at least a first portion of an interior side of said hood;

a retaining means affixed to said hood for retaining the one-piece blank in a shape of the hood;

a mirror means attached to the hood and for redirecting the flash emanating from the light-emitting surface of the flash unit into the hood for reflection outwardly by the reflective surface of the hood so as to illuminate a photographic subject; and releaseable attachment means for securing the hood and the mirror means to the flash unit when in use such that the mirror means is retained adjacent the light-emitting surface of the flash unit at an angle between 30° and 60° inclusive, said releasable attachment means for retaining the reflective surface of said first portion of the hood in substantially parallel relationship to the mirror, said one-piece blank having a first transverse crease along which the hood can be folded flat when not in use, and said one-piece blank being provided with second and third creases which define two separate flaps, one of said flaps being at one side of the blank, the other of said flaps being at another side of the blank, said flaps foldable in order to permit the blank to be folded into a hood shape, and said one-piece blank having an area between said flaps which defines said first portion of the hood that is provided with said reflective surface.

2. The reflector as claimed in claim 1, wherein the one-piece blank has a projecting integral flap which comprises said mirror means, said integral flap comprising a reflective surface on one side thereof and being foldable along at least one of said creases such that when the blank is assembled into the hood shape and is secured to the flash unit by the attachment means said reflective surface of the projecting integral flap faces said reflective surface of the hood.

3. The reflector as claimed in claim 1, wherein the mirror means is angled at approximately 45° with respect to the light-emitting surface of the flash unit, said hood being creased such that the retaining means retains said reflective surface of said first portion of the hood in substantially parallel relationship to the mirror means.

4. The reflector as claimed in claim 1, wherein the blank has a pair of spaced parallel slots which extend from one side of the blank at right angles thereto, said second and third creases extending from closed ends of said pair of slots respectively to corners at ends of the opposite side of the blank.

5. The reflector as claimed in claim 4, wherein said first transverse crease of said blank intersects said second and third creases, another pair of creases being formed at each intersection of said first crease with said second and third creases, said another pair of creases radiating outwardly from the intersection toward an adjacent side of the blank at equal angles of approximately 30° to the first crease so as to define two triangular areas at each side of the first crease.

6. The reflector as claimed in claim 5, said two triangular areas each being movable between a first position and a second position, said first position being flat with said blank, said second position forming said blank into said hood shape.

7. The reflector as claimed in claim 6, wherein said retaining means for retaining said two triangular areas in contact with one another in order to retain the hood shape in use when secured to the flash unit.

8. The reflector as claimed in claim 1, wherein the interior reflective surface is coated with a polyester film.

9. The reflector as claimed in claim 1, wherein the interior reflective surface is coated with a gold colored metallized polyester film.

10. The reflector as claimed in claim 1, wherein the interior reflective surface is coated with a silver colored metallized polyester film.

11. A photographic reflector for a flash unit for a camera to redirect the flash emanating from a light-emitting surface of the flash unit to illuminate a photographic subject comprising:
   a hood assembleable for use from a creased one-piece blank, said hood being provided with an interior reflective surface on at least a first portion of an interior side of said hood;
   a retaining means connected to said hood to retain the one-piece blank in a hood shape; and
   releaseable attachment means for securing the hood to the flash unit when in use such that said reflective surface is retained at an angle between 30° and 60° inclusive with respect to the light-emitting surface of the flash unit, said one-piece blank having a substantially rectangular shape and which is provided with a first transverse crease along which the hood can be folded flat when not in use, and which is provided with second and third creases to define two separate flaps, one of said flaps being at one side of the blank, another of said flaps being at an opposite side of said blank, said flaps being foldable so as to permit the blank to be folded into said hood shape, an area between said flaps defining said first portion of the hood, the blank having a pair of spaced parallel slots which extend from said one side of the blank at right angles thereto, said second and third creases extending from closed ends of said pair of spaced parallel slots respectively to corners at ends of the opposite side of the blank, said first transverse crease of said blank intersects said second and third creases, another pair of creases being formed at intersections of said first crease with said second and third crease respectively, each of said another pair of creases radiates outwardly from the intersection towards an adjacent side of the blank at equal angles of substantially 30° to the first crease so as to define two triangular areas at each side of the first crease.

12. The reflector as claimed in claim 1, wherein when the respective triangular areas at each end of the first crease are pinched together said blank bends along the second and third creases to form the hood shape.

13. The reflector as claimed in claim 12, said retaining means for retaining said triangular areas in contact with one another in order to retain the hood shape in use when secured to the flash unit.

14. The reflector as claimed in claim 11, wherein the reflective surface is coated with a polyester film.

15. The reflector as claimed in claim 14, said reflective surface being coated with a metallized polyester film of a color selected from a group consisting of gold and silver.

* * * * *